Patented May 9, 1950

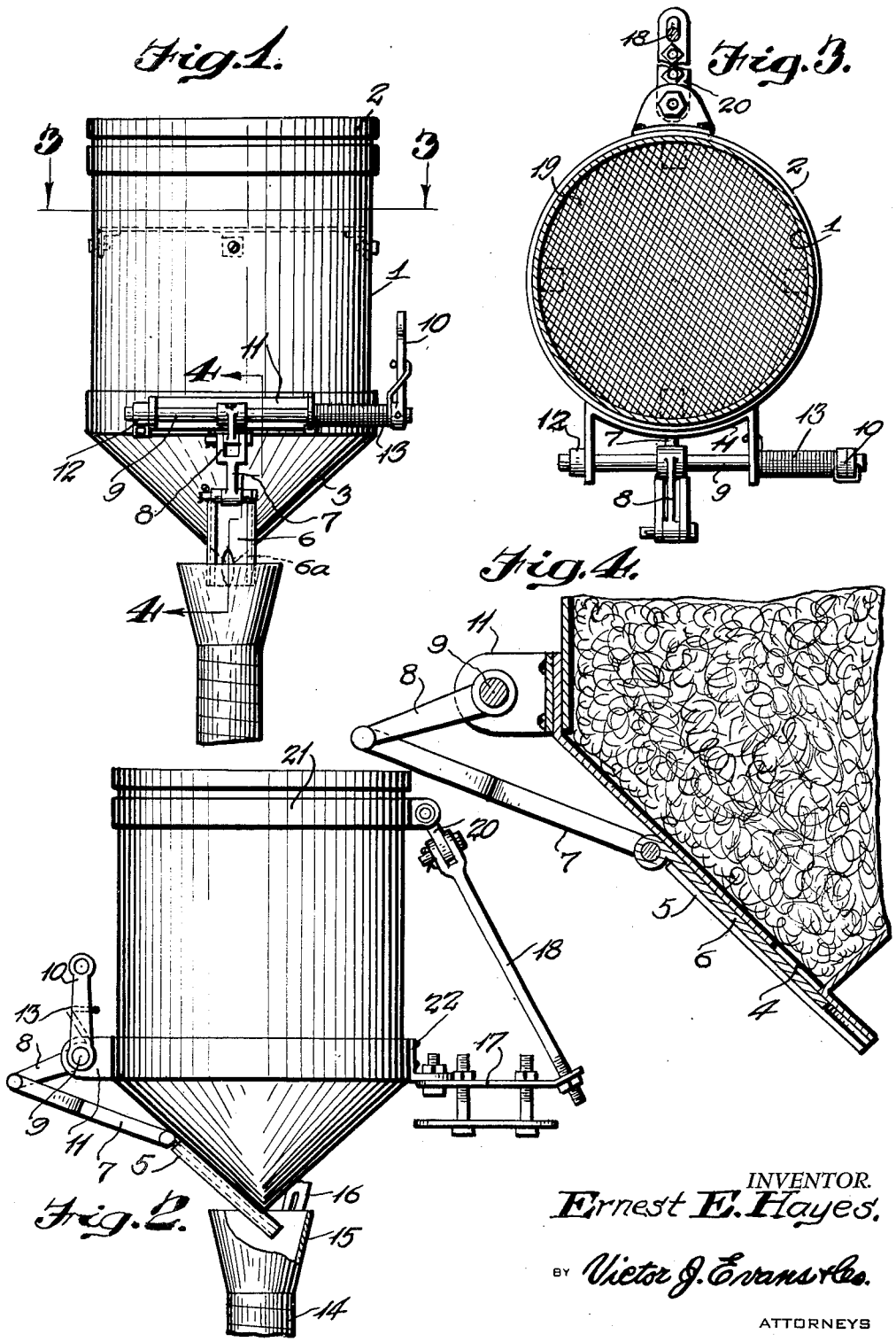

2,507,010

UNITED STATES PATENT OFFICE 2,507,010

HOPPER WITH ADJUSTABLE SUPPORT MEANS

Ernest E. Hayes, Van Nuys, Calif.

Application August 7, 1946, Serial No. 689,023

1 Claim. (Cl. 222—181)

This invention relates to improvements in fertilizer feeders, and has for an object the provision of a fertilizer feeder which will dispense commercial fertilizer without requiring any mechanical or moving parts driven by power from a motor, tractor, or the like.

A further object is the provision of a fertilizer feeder having a gravity feed which acts upon the hour glass principle, making it valuable for use as a stationary feeder, which can be placed over a stream of water, putting the fertilizer in the water, and allowing the stream of water to carry the fertilizer over the land.

A further object is to provide a fertilizer feeder which can be attached to any piece of farm machinery by a clamp, allowing the farmer to apply fertilizer to the land, and at the same time perform other operations.

These and other objects are attained by the novel construction and arrangement of parts hereinafter described and illustrated by the accompanying drawings, forming a part hereof, and in which:

Fig. 1 is a front elevational view of a fertilizer feeder embodying the invention.

Fig. 2 is a side elevational view of the feeder.

Fig. 3 is a sectional view taken on the line 3—3 of Fig. 1.

Fig. 4 is a sectional view taken on the line 4—4 of Fig. 1.

Referring to the drawings, the fertilizer feeder is shown to comprise a cylindrical hopper 1, open at the top, and having a cover 2 with turned down edges to keep water out of the hopper. The bottom 3 of the hopper is conical with an oblong opening 4 starting at the apex of the cone and running up the front side to allow fertilizer to run from the hopper. Attached to the side of the conical section of the hopper is a flat rectangular piece of metal 5 with an oblong hole therein directly over the hole 4. The ends of the piece 5 extend above and below the hole, and the sides of piece 5 are turned in on each edge making grooves for a gate 6 to slide up and down in. The gate 6 is a flat piece of metal which regulates the amount of fertilizer flowing out of hole 4, or it closes the hole entirely.

The upper end of the gate 6 is rolled back down and a piece cut out of the center to accommodate a pin which connects the gate to a rod 7. The gate 6 also has a V-shaped notch 6a in the center of its bottom edge. The rod 7 is pivotally connected to a link 8, which in turn is fixed to a shaft 9, journalled in a bracket 11.

A member 12 serves as a collar for shaft 9 and a stop to regulate the distance the gate can be opened.

A main control lever 10 is fixed to the shaft 9 and controls the movement of gate 6. The shaft 9 is encircled by a spring 13 which normally tends to close the gate 6 when lever 10 is released. Below the hopper is positioned a flexible tube 14 through which the fertilizer runs to the ground, the tube fitting in the lower end of a tube holder 15. The holder has a clip which engages a clip 16 on the hopper to hold the tube up.

An adjustable clamp 17 is attached to the hopper on the side opposite the gate 6. The clamp is made so that it will clamp on to nearly any kind of shape of bar of metal or wood so that it can be attached to almost anything. The clamp is pivotally connected to a bracket 22 on the hopper, so that the hopper can be set any angle within the radius of a half circle. A brace rod 18 runs through a hole in the back end of the clamp 17 and up to the top of the hopper where it fastens to a swivel 20, which allows the hopper to swing but still be braced. The swivel 20 is supported by a band 21 around the top of the hopper.

A fine screen 19 fits on the inside of the hopper to screen the lumps out of the fertilizer so that it will not clog or stop running out of the feeder. The screen is removable.

It will be seen that there has been provided a simple and effective fertilizer feeder which does not require motor power for its operation, relying solely on a gravity feed. Obviously, the feeder can be attached to almost anything and consequently conveniently used almost anywhere.

The above description is to be considered as illustrative and not limitative of the invention of which modifications can be made without departing from the spirit and scope of the invention as set forth in the appended claim.

The invention having been described, what is claimed is:

In a hopper device a hopper having an outlet at the bottom and a wall portion, a bracket connected to the wall portion and extending laterally therefrom, a clamp comprising a top member, said bracket connected to the clamp member in angular adjustment with respect thereto, said clamping member being adapted to receive an angularly inclined brace rod, a brace rod extending upwardly from said member and adjustably secured thereto, a swivel connected to the upper end of the rod and to the upper part of the hopper whereby to permit the angular adjustment of the hopper with respect to the clamp member, and means for securing the rod to the clamp member in any one of its adjusted positions.

ERNEST E. HAYES.

REFERENCES CITED

The following references are of record in the file of this patent:

UNITED STATES PATENTS

| Number | Name | Date |
|---|---|---|
| 837,891 | Shaver | Dec. 4, 1906 |
| 1,029,431 | Elliott | June 11, 1912 |
| 1,171,239 | Pierce | Feb. 8, 1916 |
| 1,751,535 | Terborg | Mar. 25, 1930 |